United States Patent [19]

Fischer

[11] 4,065,996
[45] Jan. 3, 1978

[54] ANCHORING DEVICE FOR USE IN MASONRY AND LIKE STRUCTURES

[76] Inventor: Artur Fischer, Altheimer Strasse 219, D-7241 Tumlingen, Germany

[21] Appl. No.: 641,917

[22] Filed: Dec. 18, 1975

Related U.S. Application Data

[63] Continuation of Ser. No. 476,289, June 4, 1974, abandoned.

[30] Foreign Application Priority Data

June 9, 1973 Germany .................................. 2329677

[51] Int. Cl.² ............................................. F16B 13/06
[52] U.S. Cl. ........................................... 85/64; 85/73; 85/1 JP
[58] Field of Search ................... 85/64, 73, 74, 75, 76, 85/79, 77, 1 S, 1 JP; 52/378, 713, 704; 277/209, 200

[56] References Cited

U.S. PATENT DOCUMENTS

| 768,283 | 8/1904 | Jenkins ........................................ 85/64 |
| 1,232,274 | 7/1917 | Gay .............................................. 85/77 |
| 1,628,253 | 5/1927 | Lyddane ...................................... 85/67 |
| 2,068,968 | 1/1937 | Urbanek et al. ........................ 85/1.5 R |
| 2,356,947 | 8/1944 | Pranger et al. ........................ 277/200 |
| 2,936,015 | 5/1960 | Rapata .................................. 85/1.5 R |
| 3,302,509 | 2/1967 | Modrey ...................................... 85/64 |
| 3,379,089 | 4/1968 | Williams .................................... 85/73 |
| 3,471,183 | 10/1969 | Fischer .................................... 52/378 |
| 3,751,048 | 8/1973 | Rode .................................... 277/200 |
| 3,837,257 | 9/1974 | Fischer ...................................... 85/64 |
| 3,922,831 | 12/1975 | Fischer .................................. 85/64 X |

FOREIGN PATENT DOCUMENTS

| 1,124,922 | 7/1956 | France .................................. 85/1 JP |
| 1,096,193 | 12/1954 | France .................................. 85/1 JP |

Primary Examiner—Ramon S. Britts
Attorney, Agent, or Firm—Michael J. Striker

[57] ABSTRACT

A first element is adapted to be received and anchored in a hole of a structure, and a second element has a first portion located in the hole and secured in the first element, and a second portion having a part which extends outwardly from the hole and is adapted to carry an object at a distance from the structure. An axially yieldable protective sleeve surrounds the afore-mentioned part of the second portion intermediate the structure and the object in sealing contact with both, so as to prevent the access of corrosion-producing media to the elements.

9 Claims, 1 Drawing Figure

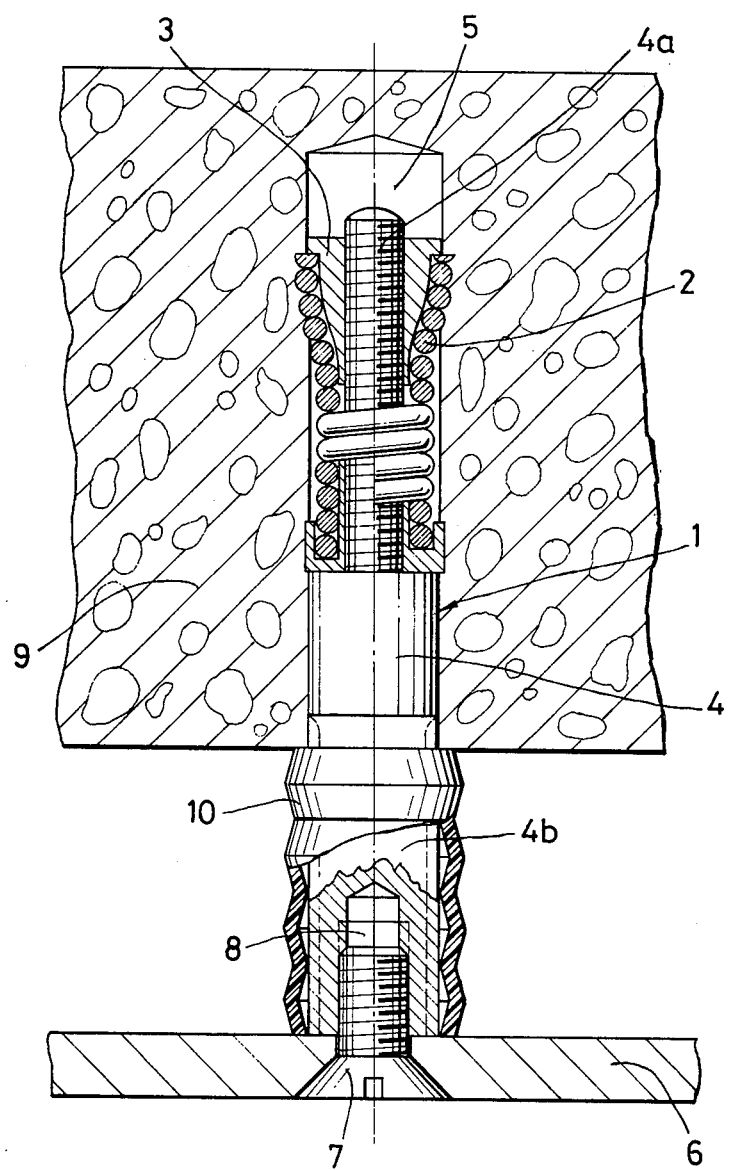

ANCHORING DEVICE FOR USE IN MASONRY AND LIKE STRUCTURES

This is a continuation of application Ser. No. 476,289, filed June 4, 1974, now abondoned.

BACKGROUND OF THE INVENTION

The present invention relates ge

Anchoring devices are used for anchoring in masonry structures or other structures, wherein a portion of the device — usually a portion of a screw or bolt — extends outwardly of a hole formed in the structure for the anchoring purposes, and carries at some spacing from the exterior surface of the structure an object, such as a cladding panel or the like. The trouble with these anchoring arrangements is that at least the portion which extends beyond the masonry or other supporting structure, i.e. the portion which is located between the supporting structure and the cladding panel, is exposed to the sometimes deleterious ambient conditions, such as moisture, corrosive gas in the atmosphere, or the like, which may cause destruction of this portion due to corrosion. Of course, it is possible to make at least the portions which are so exposed of material that is resistant to corrosion, such as specialty steels. However, these steels are much more expensive than the materials that are normally used for this purpose, and it is also much more difficult to work with them; as a result, the use of such specialty materials would substantially increase the manufacturing and selling expenses of these anchoring devices.

It is, however, important that these devices be available as inexpensively as possible, because they are used in large quantities, so that increases in the manufacturing and selling cost of such devices can represent substantial additions to the expenses involved in a construction project, renovation project or the like.

SUMMARY OF THE INVENTION

Accordingly, it is an object of the present invention to provide an improved anchoring device of the type in question, which avoids the aforementioned disadvantages.

More particularly, it is an object of the present invention to provide such an improved anchoring device which is reliably protected against corrosion resulting for the reasons mentioned above, without having to utilize specialty materials.

Another object of the invention is to provide such an anchoring device which is inexpensive to produce despite the improved protection which it affords.

In keeping with the above objects, and with others which will become apparent hereafter, one feature of the invention resides in an anchoring device for use in masonry and like structures which, briefly stated, comprises a first element that is adapted to be received and anchored in a hole of a structure, and a second element having a first portion located in this hole and secured in the first element, and a second portion having a part extending outwardly from the hole and adapted to carry an object at a distance from the structure. An axially extendable yieldable protective sleeve surrounds the aforementioned part of the second portion intermediate the structure and the object in sealing contact with both of the latter, so as to prevent the access of corrosion-producing media to these elements.

Such a device is first anchored in the supporting structure, that is the masonry wall or the like, and the protective sleeve which is axially yieldable is then placed around the part projecting out from the hole in the support structure, so as to be located between the support structure and the cladding panel or other object which this part carries at a spacing from the support structure. The sleeve is slightly axially compressed between and by engagement with the object and the support structure, thus engaging the two in sealing contact. The slight axial compression assures that this sealing contact will be effective over long periods of time, so that the sleeve protects the exposed part of the second element reliably against corrosion. Since the diameter of the sleeve is greater than that of the hole in the support structure, that end of the sleeve which engages the support structure surrounds the outer open end of the hole with spacing, so that the sleeve also reliably prevents the entry of corrosion-producing media into the hole, where they might damage those parts of the device which are located within the hole.

The present invention makes it possible to produce the device entirely of relatively inexpensive materials, certainly materials which are not specialty materials in the sense of the aforementioned special steels or the like, since such materials need have no particular resistance to corrosion, being protected reliably by the presence of the sleeve. On the other hand, the additional expenses involved by supplying the sleeve as a part of the device are of a very minor nature and are in no way comparable to the increases in manufacturing cost that would be required if the device were to be made wholly or in part of specially corrosion-resistant materials.

The sleeve of the novel device may be of a rubber or rubber-like elastomeric material, such as a synthetic plastic, that is capable of yielding to the requisite extent. In addition the sleeve may be constructed as a bellows to facilitate such yielding in longitudinal direction, because this latter construction in particular assures a significant yielding in axial direction and thus makes it possible to use a single sleeve for all applications, irrespective of the greater or lesser extent to which the second portion of the second element might extend outwardly from the hole in the support structure in different applications. Being able to use a single sleeve further reduces expenses, because it requires the manufacture of only one type of sleeve, and this reduces the manufacturing costs and at the same time reduces the stock-keeping expenses.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a sectional view, illustrating an embodiment of the invention.

DESCRIPTION OF THE PREFERRED EMBODIMENT

The FIGURE shows by way of example an embodiment of the invention. The device in toto is identified with reference numeral 1 and utilizes an expansion anchor sleeve 2 which here is in form of a block spring composed of a plurality of wire convolutions. Located at the leading end of the sleeve 2, that is the end which is first inserted into the hole 5 formed in the supporting structure 9, is an expansion member 3 which has a central tapped bore into which a threaded portion of a screw or bolt 4, constituting an expander member, can be introduced so as to mesh with the screw threads therein. The member 3 has a conical portion which extends into and expands the sleeve 2, and a cylindrical flange whose outer diameter substantially equals the inner diameter of hole 5 and which abuts the terminal convolution of sleeve 5 to prevent member 3 from being drawn through the sleeve. An annular cap surrounds the terminal convolutions of the sleeve 2 at the outer end thereof. The screw has a portion 4a provided with the screw threads, and a portion 4b having a larger diameter than the portion 4a, so that the two form with one another a shoulder which in this embodiment is located within the hole 5. The outer diameter of the portion 4b equals the outer diameter of the sleeve 2 in non-expanded condition; i.e. since the outer diameter of the expansion anchor sleeve 2 normally equals the inner diameter of the hole 5 in which it is to be anchored, the outer diameter of the portion 4b equals the inner diameter of the hole 5. The largest part of the portion 4b extends outwardly beyond the hole and carries the object 6, which is here a cladding panel or plate. The latter is formed with a hole through which a screw 7 having a head is extended and threaded into the outer end of the portion 4b, to hold the cladding panel 6 in place. The outer end of the portion 4b is provided for this purpose with a bore having internal threads 8 into which the screw 7 can be threaded.

When the screw 4 is turned in requisite sense, it will draw the expander member 3 into the sleeve 2, expanding the same into anchoring engagement with the material surrounding the hole 9, as illustrated in the drawing.

To provide the desired corrosion protection, the protective sleeve 10 is provided which is placed about the exposed part of the portion 4b before the cladding panel 6 is put in place. Since the length of the sleeve 10 is under all circumstances at least slightly greater than that part of the portion 4b which extends outwardly of the hole 5, the securing of the cladding panel 6 by means of the screw 7 or means for exerting axial pressure will assure that sufficient axial pressure is exerted upon the sleeve 10 — due to the engagement of its opposite axial ends with the structure 9 and the cladding panel 6, respectively — so that the sleeve 10 is somewhat axially compressed, tightly engaging the structure 9 and the cladding panel 6 in sealing relationship. The sleeve 10 may be constructed as a bellows, as illustrated in the drawing, for the reasons mentioned earlier, namely to be able to use a single sleeve which is possible due to the substantial ability of a bellows-like sleeve to yield in axial direction; however, the sleeve 10 need not be constructed as a bellows and need merely be slightly yieldable in axial direction, although it will then not have the aforementioned universality of application.

All parts of the device according to the present invention, with the exception of the sleeve 10, may be made of inexpensive metals, and certainly are not required to be made of metals which have any particular resistance to corrosion due to moisture, chemical influence or the like. The sleeve 10 may be made of any suitable synthetic plastic material, for instance polyethylene, polyvinyl chloride, or any of the other synthetic plastic materials or even nautral rubber that are known in the art and have the necessary characteristics. The sleeve 10 could, inter alia, also be made of synthetic plastic foam material, as long as the foam is of such type as to prevent the migration of deleterious media through it, that is of the closed-cell type or else of the open-cell type which is provided at the exterior and/or the interior of the sleeve 10 with a non-porous skin.

It will be understood that each of the elements described above, or two or more together, may also find a useful application in other types of constructions differing from the types described above.

While the invention has been illustrated and described as embodied in an anchoring device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An anchoring device for use in mounting an object at a distance from masonry and like supporting structures, comprising a supporting structure having a mounting hole and a mounting surface; a first element adapted to be received and anchored in said hole of said structure, said first element including an expansion sleeve member, and an expander member adapted to be drawn into said expansion sleeve member; an object having a surface facing said mounting surface and defining therewith a gap communicating with the ambient atmosphere; a second element having a first portion located in said hole and secured in said first element, said first portion of said second element being adapted to draw said expander member of said first element into said expansion sleeve member of the latter, and a second portion having a part extending outwardly from said hole across said gap and adapted to carry said object at a predetermined distance from said structure; and means for preventing the access of corrosion-producing media in said gap to said elements, said preventing means including an axially resiliently yieldable circumferentially-complete protective tubular sleeve having axially spaced end faces and surrounding said part of said second portion of said second element in said gap intermediate said structure and said object, said sleeve having an uncompressed length and a partially compressed length slightly smaller than said uncompressed length, and means for exerting axial compressive pressure on said tubular sleeve until said compressed length equals said predetermined distance for thereby effecting direct sealing contact of said end faces thereof with said surfaces, so as to prevent access of corrosion-producing media from said gap to said elements.

2. An anchoring device as defined in claim 1, wherein said sleeve is of elastomeric material.

3. An anchoring device as defined in claim 1, wherein said sleeve is of a synthetic plastic material.

4. An anchoring device as defined in claim 1, wherein said sleeve is configurated as a bellows.

5. An anchoring device as defined in claim 1, wherein said expansion sleeve member is a wire block spring.

6. An anchoring device as defined in claim 1, wherein said expansion sleeve member is a wire block spring having a leading end which is to be inserted first into said hole, and wherein said expander member is located at said leading end and has a conical first portion received in the same and a flange portion located outwardly adjacent said leading end.

7. An anchoring device as defined in claim 6, wherein said flange portion has an outer diameter which is substantially equal to the inner diameter of said hole.

8. An anchoring device as defined in claim 1, wherein said expander member has a tapped bore axially aligned with said expansion sleeve member, and said second element has a screw-threaded portion received in and meshing with the threads of said tapped bore.

9. An anchoring device as defined in claim 6, wherein said first portion of said second element has a smaller diameter and extends through said expansion sleeve member and engages said expander member, and wherein said second portion has a larger diameter and forms with said first portion a shoulder; and further comprising an annular cap surrounding said first portion and abutting said shoulder, said annular cap having two concentric annular collars an outer one of which surrounds the trailing end of said expansion sleeve member and an inner one of which extends into said expansion sleeve member so as to prevent turning of said sleeve member due to friction with the same and with the material surrounding said hole.

* * * * *